United States Patent
Becker

(10) Patent No.: US 6,294,739 B1
(45) Date of Patent: Sep. 25, 2001

(54) ELECTRICITY DISTRIBUTION BAR

(75) Inventor: Franck Becker, Genlis (FR)

(73) Assignee: Schneider Electric Industries SA, Rueil-Malmaison (FR)

( * ) Notice: Subject to any disclaimer, the term of this patent is extended or adjusted under 35 U.S.C. 154(b) by 0 days.

(21) Appl. No.: 09/458,991

(22) Filed: Dec. 10, 1999

(30) Foreign Application Priority Data

Dec. 14, 1998 (FR) .................................. 98 15793

(51) Int. Cl.$^7$ ....................................... H01B 5/00
(52) U.S. Cl. ......................... 174/126.1; 174/133 R; 174/133 B; 174/88 B
(58) Field of Search ................ 174/88 B, 68.2, 174/70 B, 71 B, 72 B, 99 B, 133 B, 149 B, 126.1

(56) References Cited

U.S. PATENT DOCUMENTS

| | | | |
|---|---|---|---|
| 3,609,215 | * | 9/1971 | Giger, Jr. .................... 174/88 B |
| 3,634,810 | * | 1/1972 | Pemberton ................... 339/22 B |
| 4,118,639 | * | 10/1978 | Rosey et al. ................. 307/147 |
| 4,181,396 | * | 1/1980 | Olashaw ..................... 339/263 R |
| 4,945,188 | * | 7/1990 | Jackson ..................... 174/16.2 |
| 5,166,867 | * | 11/1992 | Seyama et al. ................ 361/407 |
| 5,664,378 | * | 9/1997 | Bettigole et al. ............... 52/414 |
| 5,760,339 | * | 6/1998 | Faulkner et al. ............... 174/88 B |
| 5,866,850 | * | 2/1999 | Kobayashi ..................... 174/98 |
| 6,100,473 | * | 8/2000 | Wagener ..................... 174/99 R |

FOREIGN PATENT DOCUMENTS 2 397 723   2/1979  (FR) .
2 034 536   6/1980  (GB) .

OTHER PUBLICATIONS

William E. Veerkamp, Industry Applications Society 42nd Annual Petroleum and Chemical Industry Conference, Conf. 42, pp. 187–195, "Copper–to–Aluminum in High Direct–Current Bus Systems", Sep. 1995.

* cited by examiner

Primary Examiner—Dean A. Reichard
Assistant Examiner—William H. Mayo, III
(74) Attorney, Agent, or Firm—Oblon, Spivak, McClelland, Maier & Neustadt, P.C.

(57) ABSTRACT

A profiled aluminum bar for electricity distribution includes a metal component 20 that is assembled with an aluminum profile 10 through respective aligned lobes of complementary shape, to form a joint of, for example, a winding shape, and providing the assembly with resistance to tensile forces. The component 20 can notably be a contact component made of copper with a tapping or jointing function, or an aluminum profile providing an extension to the bar at right angles to it.

7 Claims, 3 Drawing Sheets

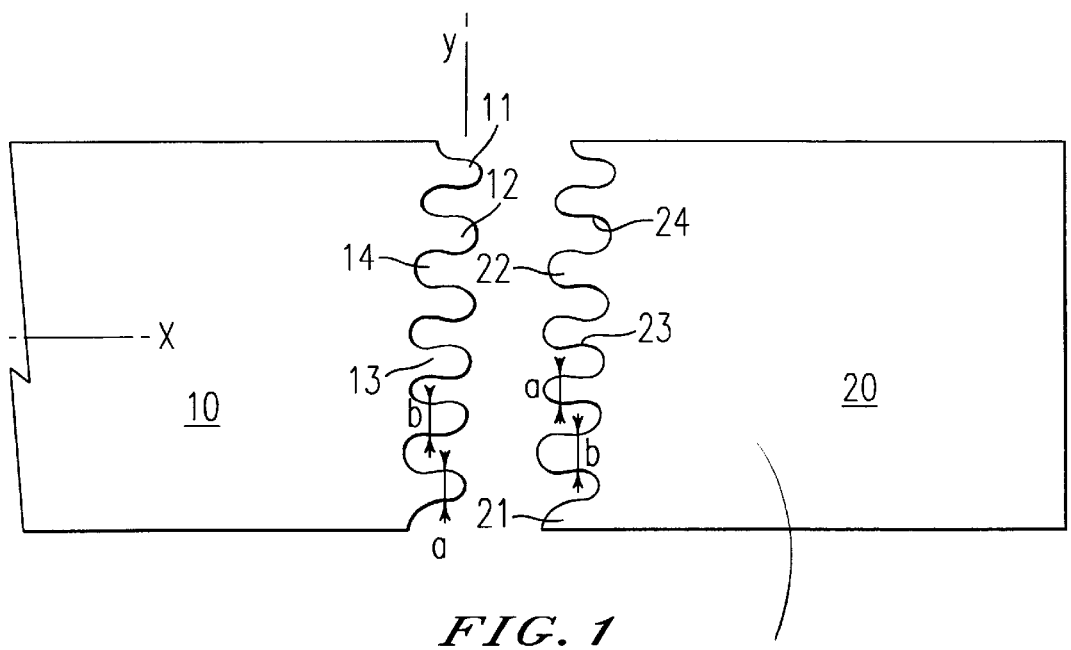
FIG. 1
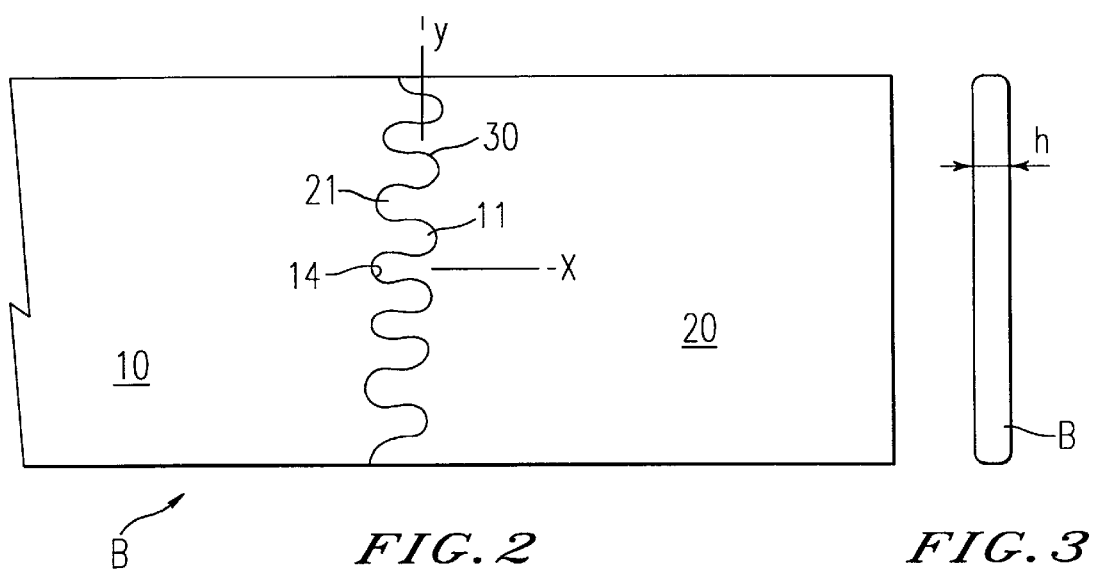 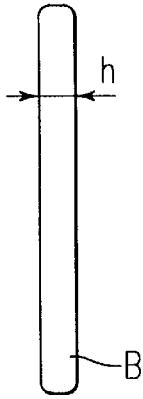
FIG. 2    FIG. 3

ELECTRICITY DISTRIBUTION BAR

BACKGROUND OF THE INVENTION

1. Field of the Invention

This invention relates to an electricity distribution bar comprising on the one hand an aluminum profile which extends along a main direction, and, on the other hand, at least one metal connecting component, this component being brought into intimate contact with the profile. The connecting component can be either a contact component capable of providing an electrical tapping device or a device for interconnecting with another bar, or an aluminum profile that extends the profile under consideration, in a straight line or through an angle.

2. Description of Related Art

There are numerous bars in existence, intended for medium or high power electricity distribution. Hence the patent FR-1 599 973 describes a method of transfer from one contact component made of copper to a bar made of aluminum by directly stamping it. It is known that aluminum is advantageous for producing such bars since it is less costly than copper; but as it is not such a good conductor as copper, it is essential that the contact surfaces to be provided at the tapping or jointing places of the line must be produced using copper components or layers of copper which are joined at least in places.

On the other hand, it is desirable to make an aluminum electricity distribution bar integral with the tapping or jointing components made of copper, aluminum or any other suitable metal or alloy, or an angle bar made of aluminum by forming an assembly that is very strong mechanically.

This invention aims to make possible the joining of a connecting component such as a contact component or another profile to the aluminum profile in a simple manner that is electrically reliable and mechanically strong.

According to the invention, the metal connecting component is assembled to the profile by several aligned lobes of complementary shape at the edges of the metal component and of the profile, the lobes having a head and a neck of width less than the width of the head and providing the assembly with resistance to tensile forces. Preferably, the metal connecting component has a height identical to that of the profile and the lobes have a meandering curvaceous shape. Depending on the situation, the metal connecting component is a contact component with a tapping or jointing function or an aluminum profile providing, for example, a angled extension of the bar.

The lobes of the profile and/or the connecting component are preferably stamped after interlocking the lobes of the connecting component into those of the profile in order to obtain a line of heads of one row of lobes stamped into the hollows of the row of opposite complementary lobes. The stamping marks on the lobes can be dish-shaped or cone shaped.

When the connecting component is a contact component, which advantageously can be made of copper, a brazing solder with a melting point greater than about 500° is deposited on the winding joint line between lobes opposite the profile and the contact component.

BRIEF DESCRIPTION OF THE DRAWINGS

The following description, making reference to the appended drawings in a non-limitative way, will enable the invention to be well understood.

FIG. 1 represents a frontal view of a bar conforming to the invention before assembly.

FIG. 2 represents the same bar after assembly.

FIG. 3 is a side view.

DETAILED DESCRIPTION OF THE PREFERRED EMBODIMENTS

Figure 4:
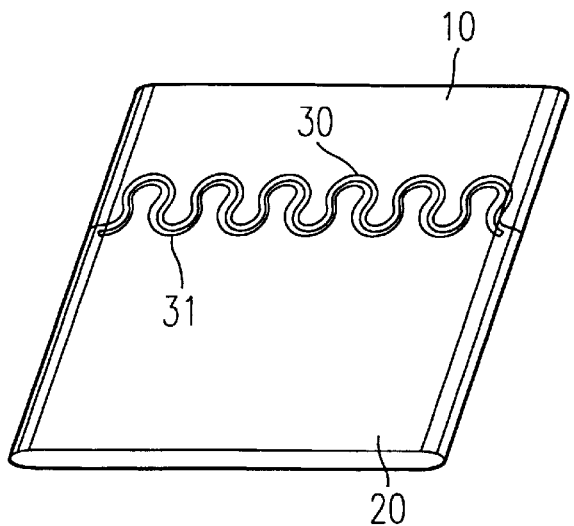
FIG. 4 to 7 show, in perspective, different forms of implementing the invention.
Figure 5:
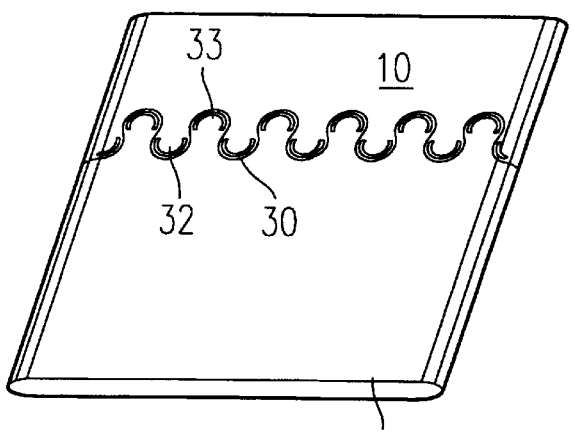

The Figure shows, in perspective, embodiment variations of the invention.

The bar B illustrated in FIGS. 1 to 3 is intended to be incorporated into a conduit for power electricity distribution, to carry currents of the order of a few hundreds or thousands of amps for example. The bar comprises, on the one hand, an aluminum profile 10 which provides a flat cross section (see FIG. 3) and extends along a main direction X, and on the other hand, at various tapping areas or at its ends, contact components made of copper 20 provided to ensure an electrically satisfactory contact at these places with a connecting component.

As is known, such a connecting component belongs to a conductor or to a tapping unit or, respectively, belongs to a jointing device which provides the union with another bar that extends the bar under consideration; this connecting component is not shown in the Figures, but would for example be constituted by a clip, The contact component has a height h identical to that of the bar. In the example shown, the contact component is fitted on the end of the bar; it may also be situated at the side of or within the body of the bar.

The profile 10 comprises, in alignment along a line Y perpendicular to X, several projecting lobes 11 each having a head 12 of width a and a neck 13 of width b less than a. The various lobes can have different shapes; in the embodiment shown, they have a single identical shape. The lobes 11 are separated by hollows 14 suitable for receiving by interlocking the complementary lobes 21 of the contact component 20. The joint line of the assembly has a winding shape.

The lobes 21 of the component 20 are also themselves aligned and separated by hollows 24 and comprise heads 22 of width a and necks 23 of width b, and once the component 20 is assembled with the profile 10 (FIG. 2), they are aligned along the line Y. The lobes 21 and the hollows 24 have a shape that is complementary to that of the hollows 14 and respectively the lobes 11.

After mutual fitting of the facing lobes 11, 21, by inserting them along a direction perpendicular to the plane of the bar, a brazing solder with a melting point greater than about 500° can be deposited on the winding joint line 30 between lobes 11, 21 to provide the seal and to contribute to the mechanical rigidity of the assembly.

Figure 6:
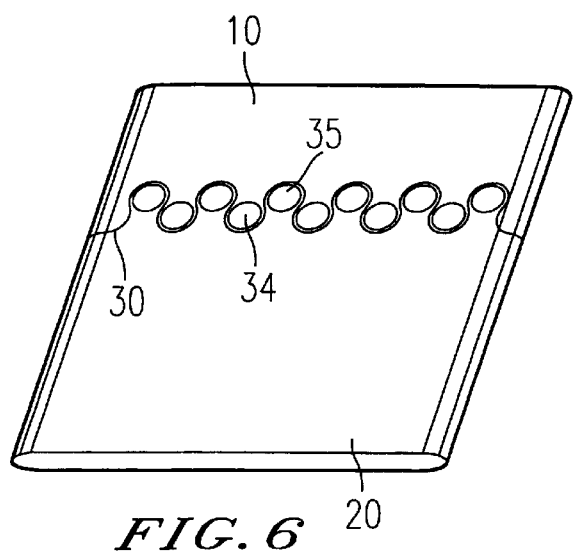
Figure 7:
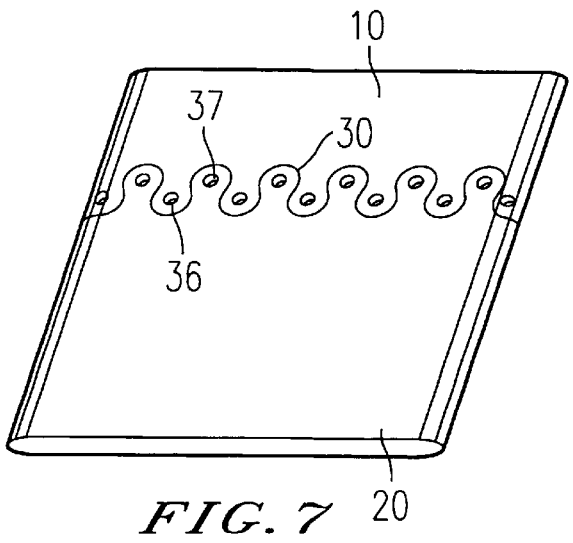

Preferably, the fitting operation is completed by a stamping operation carried out on the lobes. The stamping can be carried out on only one of the components to be coupled together, for example the profile (see FIG. 4), using a punch, the profile of which 31 marries up with that of the lobes; preferably, it is carried out on stamping lines or regions 32, 33 of the profile 10 and the contact component 20. In another manner, the stamping regions are dish-shaped 34; 35 substantially circular or elliptical and marry up with the shape of the lobes (FIG. 6) or are cone shaped 36, 37 and positioned at the center of the respective lobes. The depth of the dishes or cones can differ in the profile 10 and in the contact component 20, in order to take into account the difference in their materials. The contact component as a variant may be made of aluminum.

Figure 8:
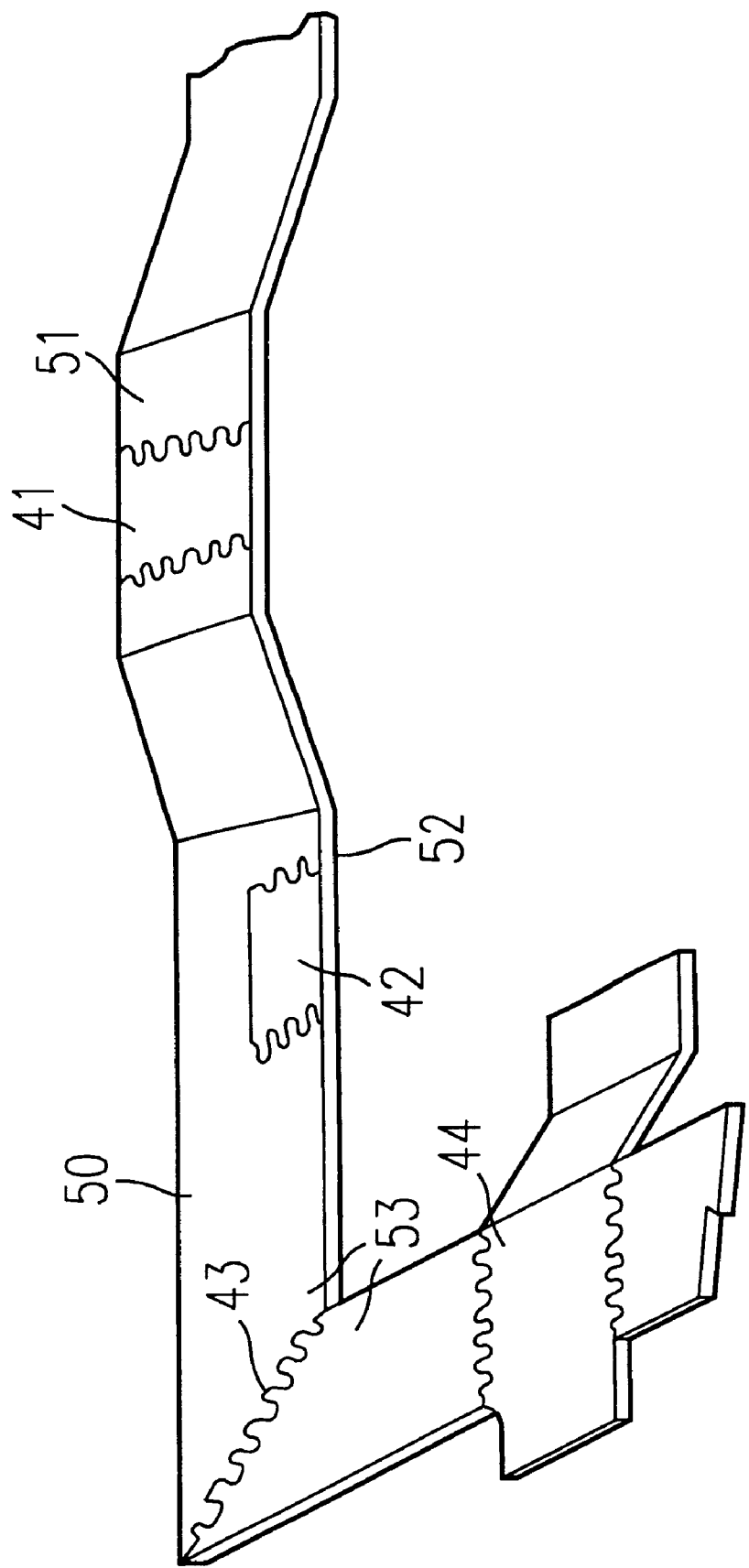
FIG. 8 illustrates various possibilities for producing bars provided by the invention.

FIG. 8 illustrates various possibilities for producing bars provided by the invention: insertion of a jointing plate 41 into an offset part 51 of a profile 50, insertion of a tapping plate 42 onto the edge 52 of the profile, an abutment at right angles at 43 for sections 53 of a bar to be connected at right angles to give the bar an angled shape, insertion of a tapping plate 44 which extends transversely beyond both edges of the profile.

What is claimed is:

1. An electricity distribution bar comprising:
    a) a profile including a first series of lobes; and
    b) at least one metal connecting component including a second series of lobes; wherein:
        1) each of the lobes in the first and second series of lobes includes a head with a head width, and a neck with a neck width that is smaller than the head width;
        2) the first and second series of lobes are complementary in shape; and
        3) the first series of lobes is interlocked with the second series of lobes to form a continuous joint line by stamping certain lobes in at least one of the first and second series of lobes in a direction transverse to a plane of the profile so as to force the first and second series of lobes into a more intimate contact and to thus provide resistance to tensile forces.

2. The bar of claim 1 wherein:

the first and second series of lobes are stamped after being put into a mutually interlocking position.

3. The bar of claim 2, wherein:

the stamping impresses dish-shaped stamping marks on the certain lobes.

4. The bar of claim 2, wherein:

the stamping impresses cone-shaped stamping marks on the certain lobes.

5. The bar of claim 1, wherein:

the connecting component is made of copper; and a brazing solder with a melting point greater than about 500° is deposited on the joint line.

6. The bar of claim 1, wherein:

the connecting component's height is identical to the profile's height.

7. The bar of claim 1, wherein:

the joint line has a winding shape.

* * * * *